United States Patent [19]

Iizuka et al.

[11] Patent Number: 5,227,901
[45] Date of Patent: Jul. 13, 1993

[54] LIQUID CRYSTAL DISPLAY DEVICE

[75] Inventors: Tetsuya Iizuka; Shinichi Kamagami; Yasuhisa Oana, all of Yokohama, Japan

[73] Assignee: Kabushiki Kaisha Toshiba, Kawasaki, Japan

[21] Appl. No.: 854,095

[22] Filed: Mar. 19, 1992

[30] Foreign Application Priority Data

Mar. 20, 1991 [JP] Japan .................................. 3-55387
Mar. 28, 1991 [JP] Japan .................................. 3-64127

[51] Int. Cl.$^5$ .............................................. G02F 1/133
[52] U.S. Cl. ........................................ 359/58; 359/60; 340/719; 340/784
[58] Field of Search ............... 359/54, 58, 59, 60; 340/719, 718, 784; 257/104, 215, 297, 288

[56] References Cited

U.S. PATENT DOCUMENTS 4,861,141 8/1989 Nakazawa ........................... 359/58

FOREIGN PATENT DOCUMENTS 0183620 8/1986 Japan ..................................... 359/58
62-58226 3/1987 Japan .
2137366 5/1990 Japan .
2137828 5/1990 Japan .

Primary Examiner—William L. Sikes
Assistant Examiner—Huy K. Mai
Attorney, Agent, or Firm—Cushman, Darby & Cushman

[57] ABSTRACT

A liquid crystal display device includes first and second substrate and a liquid crystal layer sealed between the substrates. A plurality of pixel elements are formed in a matrix pattern on the first substrate, and a plurality of driving nonlinear resistance elements are formed on the first substrate and electrically connected to the pixel electrodes, respectively. A plurality of parallel wiring electrodes are formed on the first substrate, respectively extending in parallel to the columns of the pixel electrodes, and electrically connected to the respective nonlinear resistance elements on the respective columns of the pixel electrodes. Each wiring electrode is divided at a dividing portion and has a pair of divided ends. Protecting nonlinear resistance elements are respectively formed on the divided ends of each wiring electrode so as to reduce potential difference between the divided ends when static electricity is generated at the dividing portions.

11 Claims, 5 Drawing Sheets

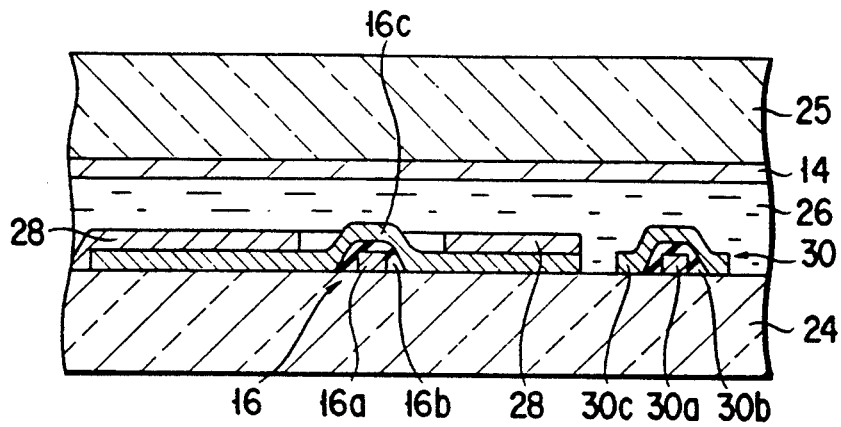
F I G. 3
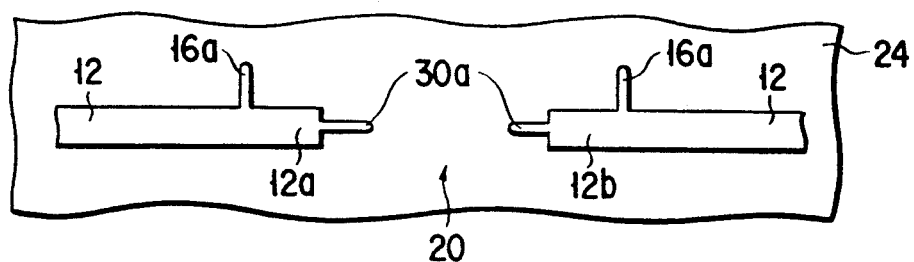
F I G. 4
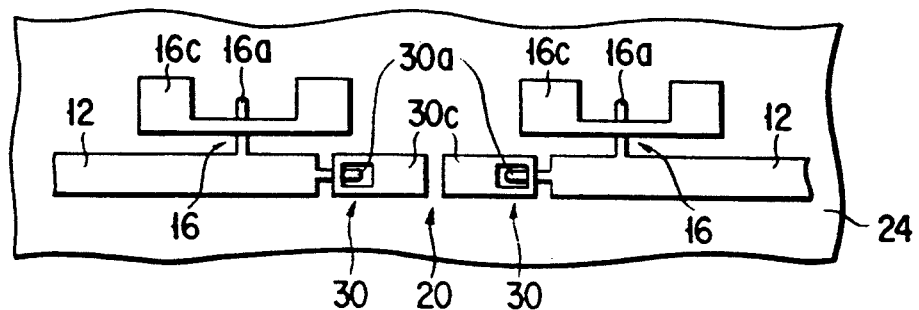
F I G. 5

LIQUID CRYSTAL DISPLAY DEVICE

BACKGROUND OF THE INVENTION

1. Field of the Invention

The present invention relates to a liquid crystal display device, and more particularly to a liquid crystal display device in which a nonlinear resistance element serving as a switching element is incorporated in each pixel.

2. Description of the Related Art

Recent years, liquid crystal display devices are used not only in relatively simple apparatuses such as watches, clocks and calculators, but also in mass storage information display apparatuses of, for example, personal computers, word processors, terminals of office automation systems, image displays of television sets, etc. In general, a multiplex driving method of matrix display, i.e., a simple matrix method is employed in a liquid crystal display device. In this method, however, due to the inherent characteristics of liquid crystal, the contrast ratio of a display section to a non-display section is of an insufficient value if the number of the scanning electrodes is about 200. It is further degraded if the number of the scanning electrodes is 500 or more. Hence, this method is not suitable for a large scale matrix display.

Under the circumstances, various methods have been developed to overcome the drawbacks of the above-described liquid display devices. One of the methods is an active matrix driving method, i.e., a method of directly driving each pixel by means of a switching element. In this method, a thin-film transistor or a nonlinear resistance elements having nonlinear current/voltage characteristics is used as a switching element.

Conventionally, various semiconductors such as mono-crystalline silicon, cadmium selenide, and tellurium have been proposed as a material of a thin-film transistor. At present, thin-film transistors formed of amorphous silicon are most generally researched. However, to form a liquid crystal display device using a thin-film transistor, a number of fine processing steps are required, resulting in a complicated manufacturing process and a low manufacturing yield. For this reason, the manufacturing cost is inevitably high. Moreover, it is very difficult to produce large scale liquid crystal display apparatuses.

In contrast, a nonlinear resistance element basically has two terminals. It is more simple and can be manufactured more easily as compared to a thin-film transistor which has three terminals. Therefore, by use of the element, the yield of manufacturing the devices can be increased and the manufacturing cost can be reduced.

There are various types of nonlinear resistance element, such as a diode type element formed by joining components made of the same material as a thin-film transistor, a varistor type element using zinc oxide, a metal—insulating layer—metal (MIM) type element, in which an insulating material is interposed between electrodes, and an MSM type element in which a semiconductor layer is interposed between metal electrodes. The MIM element is one of the most simple elements and has been practically used.

In a liquid crystal display device using an MIM element, when a driving voltage is applied across the electrodes between which a liquid crystal layer is interposed, the electrodes are charged at a small time constant. When the driving voltage is not applied, the electrodes are discharged at a large time constant. Thus, the liquid crystal is charged in a short selection period of time after the driving voltage is turned on, and maintains a sufficient voltage for a substantial period of time even after the driving voltage is turned off. Since the effective value of the driving voltage is determined by the voltage applied in the selection period, the ratio of the effective value in the driving voltage ON period to that in the driving voltage Off period can be larger than in a liquid crystal display device employing a multiplex driving method of matrix display. As a result, if the MIM element is used as a switching element, the degradation of the contrast ratio due to the increase in storage of the display device can be greatly reduced as compared to the case of the simple matrix driving method.

However, even if the MIM element is used, the contrast ratio may be degraded as in the simple matrix driving method, in the matrix display on large scale with 500 or more scanning lines. To overcome this drawback, there is provided a structure wherein each wiring electrode is divided into two at its central portion, thereby dividing the entire display screen into two blocks, each of which is driven independently, thus halving the apparent number of scanning lines.

In general, in a liquid crystal display device having an MIM element, since the insulating layer of the MIM element has a relatively small thickness of 500 to 700 Å, the withstand voltage of the layer is low. Hence, dielectric breakdown easily occurs in the MIM element owing to the static electricity generated during the process of manufacturing the device. For example, the process of manufacturing a liquid crystal display comprises a step of rubbing the substrate with cloth after an orientation film is formed on the substrate. Static electricity of 500 V to 20 kV tends to be generated especially in the rubbing step. It is difficult to prevent the generation of static electricity. In general, since electric charge concentrates at the end portions of a wiring electrode, if the display screen is divided into a plurality of blocks as described above, electric charge concentrates at the dividing portion of each wiring electrode. For this reason, a difference between the potentials of the division ends of each wiring electrode arises, and the electricity is discharged from the division ends to the display electrodes adjacent to the division ends. This discharge causes puncture of the MIM elements. The puncture or dielectric breakdown results in characteristic defects of the element, which are represented as display defects in pixel units, i.e., point defects. The point defects concentrate at the dividing portion, i.e., the boundary between the blocks of a display screen.

The applicant inspected pixel defects appearing in the boundary between the blocks of a display, and found that about half of all the pixels adjacent to the boundary were defective.

To prevent the occurrence of point defects due to static electricity, several methods have been proposed. For example, Published Unexamined Japanese Patent Application (PUJPA) No. 62-58226 discloses a structure wherein dummy pixels are provided outside the display screen. Static electricity is discharged through MIM elements which are connected to the dummy pixels, that is, the MIM elements are punctured by the static electricity, thereby preventing the breakdown of the MIM element arranged in the display section. However, this structure cannot be applied to a liquid crystal display device wherein the display section is divided into a plurality of blocks. Therefore, another method for preventing the breakdown of the element caused by static electricity is greatly in demand.

SUMMARY OF THE INVENTION

The present invention has been developed in consideration of the above circumstances, and its object is to provide a liquid crystal display device having a dividing portion in a display area, wherein display defect due to static electricity is prevented from occurring near the dividing portion.

To achieve the above object, a liquid crystal display device according to the present invention comprises: first and second substrates facing each other; a liquid crystal layer sealed between the substrates; a number of pixel electrodes formed in a matrix pattern on an inner surface of the first substrate a plurality of driving nonlinear resistance elements formed on the inner surface of the first substrate and electrically connected to the pixel electrodes, respectively, for driving the pixel electrodes; a plurality of parallel wiring electrodes formed on the inner surface of the first the substrate, respectively extending in substantially parallel to the columns of the pixel electrodes, and electrically connected to the respective nonlinear resistance elements on the respective columns of the pixel electrodes, each of the wiring electrodes being divided at a portion between two adjacent pixel electrodes and having a pair of divided ends which face each other with a distance therebetween; and protecting nonlinear resistance elements respectively formed on one of the divided ends of each of the wiring electrodes, for, when a potential difference is generated between the divided ends of each of the wiring electrodes, reducing the potential difference.

With the device as described above, a protecting nonlinear resistance element, which does not contribute to display, is provided at one of the divided ends of each wiring electrode, i.e., at the position at which puncture of the element tends to occur. Hence, even if static electricity is generated in the manufacturing process and a potential difference is caused between the divided ends of the wiring electrode, the protecting nonlinear resistance element is first punctured, thereby decreasing the potential difference. As a result, the static electricity which flows through the driving nonlinear resistance element is reduced. Thus, the driving nonlinear resistance element can be protected from the puncture.

According to an aspect of the present invention, protecting nonlinear resistance elements are respectively provided at a pair of divided ends of each wiring electrode with a distance therebetween, so as to face each other. With this structure, a potential difference generated between the divided ends is further decreased and the driving nonlinear resistance elements are reliably protected from breakdown.

According to another aspect of the present invention, protecting nonlinear resistance element are respectively formed at paired divided ends of each wiring electrode, and connected in series. A potential difference between the paired divided ends, arising due to static electricity, is applied on halves to the two protecting nonlinear resistance elements connected in series by capacity dividing. The two resistance elements are in the ON state and discharge the static electricity. As a result, the driving nonlinear resistance elements are prevented from breakdown due to static electricity.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 6 show a liquid crystal display device according to a first embodiment of the present invention, wherein FIG. 1 is a schematic diagram showing an equivalent circuit of the device, FIG. 2 is an enlarged plan view of a division portion of the display section of the device, FIG. 3 is a sectional view taken along line III—III in FIG. 2, FIG. 4 is a plan view for explaining a step of patterning lower metals of driving and protecting nonlinear resistance elements and wiring electrodes, FIG. 5 is a plan view for explaining a step of patterning upper metals of the driving and protecting nonlinear resistance elements, and FIG. 6 is a schematic plan view for explaining the flow of static electricity in the dividing portion separation of the display section;

FIGS. 9 and 10 show a liquid crystal display device according to a second embodiment of the present invention, wherein FIG. 9 is a plan view of a dividing portion of the display section of the device, and FIG. 10 is a sectional view of the device taken along line X—X in FIG. 9.

DETAILED DESCRIPTION OF THE PREFERRED EMBODIMENTS

Embodiments of the present invention will now be described with reference to the accompanying drawings.

Figure 1:
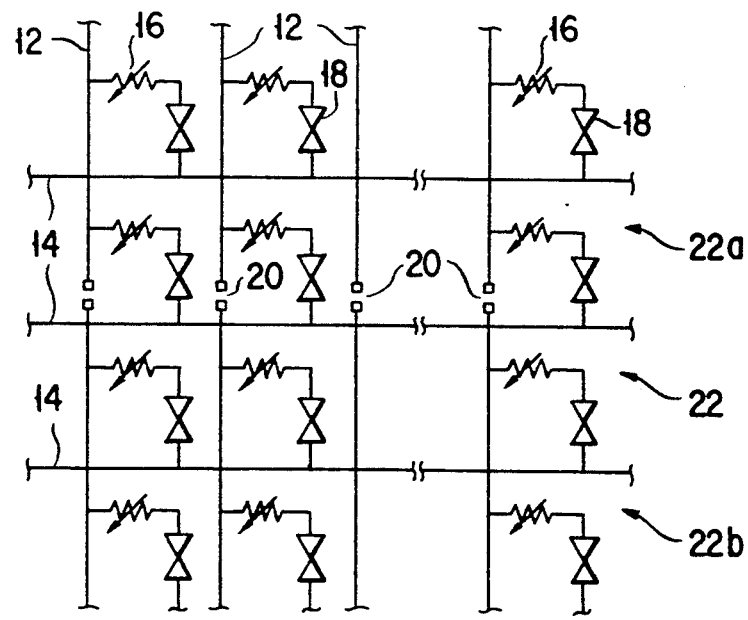

FIG. 1 shows an equivalent circuit of an active matrix type liquid crystal display device having a number of pixels arranged in a matrix pattern.

The equivalent circuit comprises a number of signal electrodes 12 extending in parallel with each other and a number of scanning electrodes 14 extending in parallel with each other and crossing over but not connected to the signal electrodes 12. At each of the crossovers of the signal electrodes 12 and the scanning electrodes 14, one of the terminals of an MIM element 16 serving as a driving nonlinear resistance element is connected to the signal electrode 12, and the other terminal of the element 16 is connected to the scanning electrode 14 via a liquid crystal cell 18. Thus, a display section 22 is constituted by 900×1152 pixels.

Each signal electrode 12 is divided by a dividing portion 20 at the longitudinal center thereof. As a result, the display section 22 of the liquid crystal device is divided into upper and lower display sections 22a and 22b in the middle, each display section being comprised of 450×1125 pixels. The display sections 22a and 22b are driven independently with the duty ratio of 1/450 and the bias ratio of 1/9. Each of the pixels is driven by the combination of a display signal applied to the signal electrode 12 and a scanning signal applied to the scanning electrode 14.

Structures of the dividing portion of the liquid crystal display device and each pixel will now be described.

Figure 2:
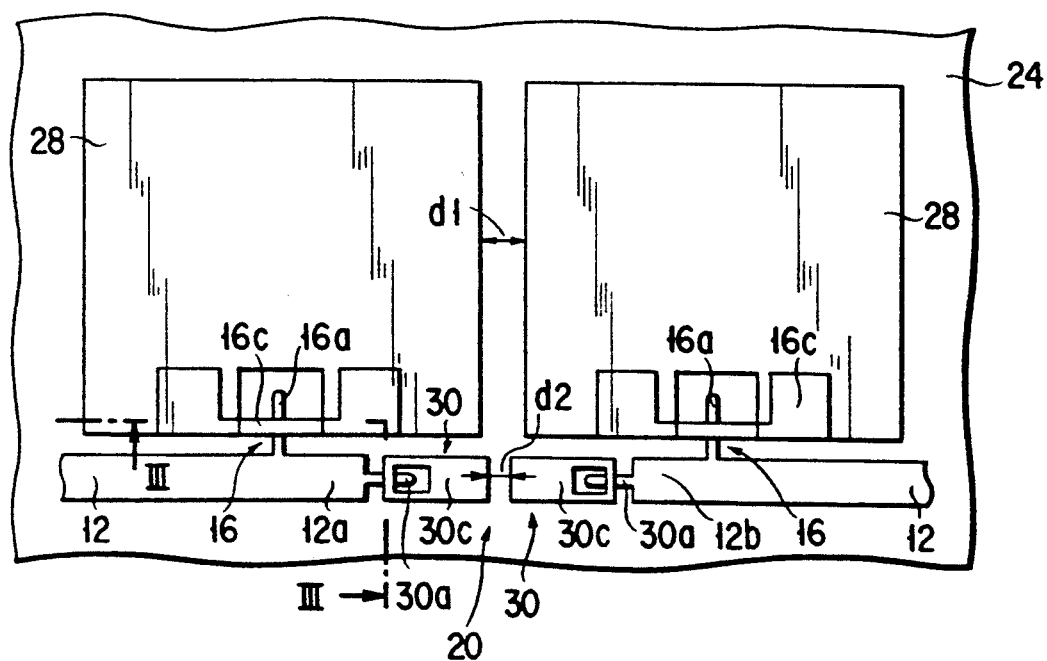

As shown in FIGS. 2 and 3, the liquid crystal display device comprises a substrate 24 made of glass, an upper substrate 25 arranged to face the substrate 24 with a distance of 1 to 20 μm therebetween, and a liquid crystal layer 26 sealed between these substrates.

A number of signal electrodes 12 are formed on the upper surface of the substrate 24. A number of transparent pixel electrodes 28 are formed on the upper surface of the substrate 24 along the signal electrodes 12, while being spaced apart from each other by a predetermined distance d1. The pixel electrodes 28 on one column are connected to the signal electrode extending along driving columns via the MIM elements 16 serving as driving nonlinear resistance elements, respectively. Each MIM element 16 comprises a lower metal 16a formed on the upper surface of the substrate 24 and extending from the signal electrode 28, an insulating layer 16b formed on the lower metal, and an upper metal 16c formed on the insulating layer. A pixel electrode 28 is formed on the substrate 24 so that part of the electrode overlaps the upper metal 16c.

The dividing portion 20 of each signal electrode 12 is located between the two adjacent pixel electrodes 28, i.e., between the two adjacent MIM elements 16. Each signal electrode 12 has a pair of divided ends 12a and 12b, which face each other with a distance therebetween. MIM elements 30 serving as protecting nonlinear resistance elements are respectively connected to the divided ends 12a and 12b.

Each of the MIM elements 30 has the same structure as the MIM element 16. More specifically, the MIM element 30 comprises a lower metal 30a connected to the corresponding divided end 12a or 12b of the signal electrode 12, an insulating layer 30b formed on the lower metal, and an upper metal 30c formed on the insulating layer 30b. In order to facilitate discharge between two MIM elements 30, the distance d2 between the opposing upper metals 30c is shorter than the distance d1 between the opposing pixel electrodes 28.

A number of transparent scanning electrodes 14 made of indium-tin-oxide (ITO), extending perpendicularly to the signal electrodes 12, are formed on the lower surface of the substrate 25.

The liquid crystal device having the above structure is manufactured as follows.

First, a first thin metal layer made of, for example, tantalum (Ta) is formed on the substrate 24 by a sputtering method. Then, as shown in FIG. 4, the first metal layer is patterned into signal electrodes 12, lower metals 16a for the driving MIM elements 16 and lower metals 30a for the protecting MIM elements 30 by a first photolithographing step.

Next, an oxide film is formed on the lower metals 16a and 30a by an anodic oxidation or the like to form insulating layer 16b for the driving MIM element 16 and insulating layer 30b for the protecting MIM element 30. Thereafter, a second thin metal layer made of, for example, chromium is formed on the substrate 24 by a sputtering method. Then, as shown in FIG. 5, the second metal layer is patterned by a second photolithographing step into upper metals 16c for the driving MIM elements 16 and upper metals 30c for the protecting MIM elements 30. In this manner, the driving MIM elements 16 made up of the lower metal 16a—the insulating layer 16b—the upper metal 16c and the protecting MIM elements 30 made up of the lower metal 30a—the insulating layer 30b—the upper metal 30c are formed.

Then, a thin ITO film is formed on the substrate 24. Subsequently, as shown in FIG. 2, the ITO film is patterned by a third photolithographing step into pixel electrodes 28 so that these electrodes are electrically connected to the upper metals 16c of the MIM elements 16. In the aforementioned steps, a matrix array substrate is produced.

Thereafter, scanning electrodes 14 made of ITO and an orientation film (not shown) are formed on the lower surface of the substrate 25. Subsequently, a rubbing step is performed with respect to the substrate 25. The substrate 25 is positioned so as to face the substrate 24 with a predetermined distance therebetween. Then, liquid crystal is injected between these substrate. Thus, a desired liquid crystal display device is completed.

In the above-mentioned manufacturing steps, particularly in the rubbing step, static electricity of 200 V to 20 kV is generated in the device. The static electricity flows in a direction as indicated by the arrows shown in FIG. 6 at the dividing portion 20 of the liquid crystal display device.

In the liquid crystal display device as described above, the protecting MIM elements 30 which do not contribute to display are respectively formed at the divided ends 12a and 12b of each signal electrode 12. Hence, a potential difference generated between the divided ends 12a and 12b of the signal electrode 12 due to the static electricity, and electricity is discharged from one end to the other. As a result, one or both of the MIM elements 30 provided at the divided ends 12a and 12b is punctured, thereby reducing the potential difference between the divided ends. Therefore, since excessive static electricity does not flow through the driving MIM elements 16, puncture of the MIM elements 16 due to static electricity is prevented.

Figure 6:
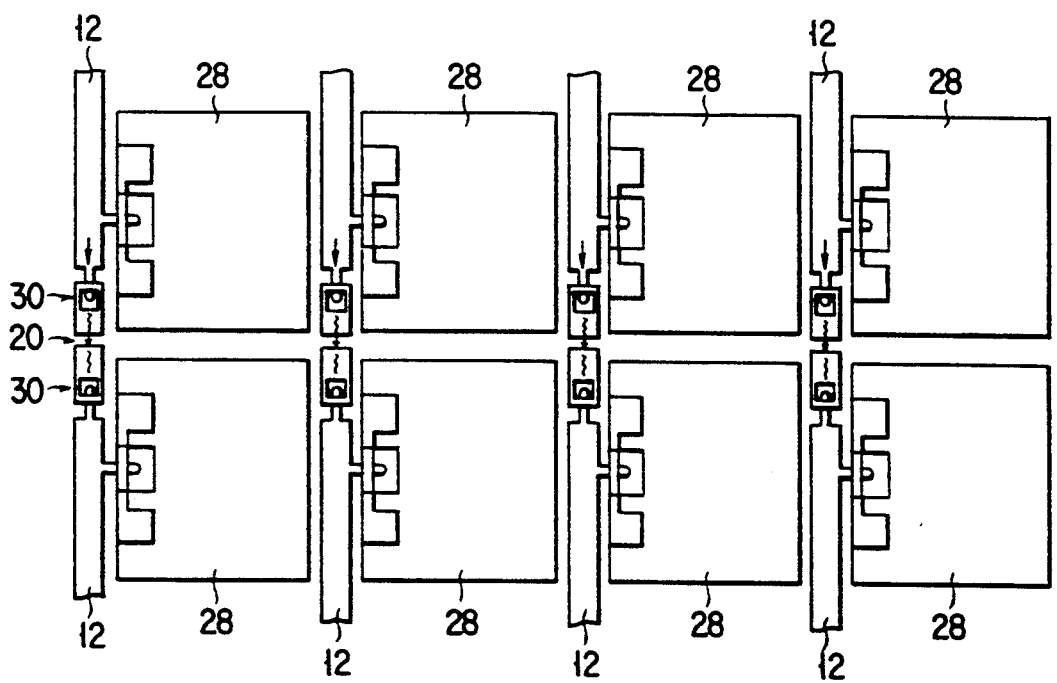

FIG. 6 shows the state of the dividing portion 20 when static electricity is generated. In FIG. 6, a symbol o represents normal pixels. As apparent from FIG. 6, no pixels near the dividing portion 20 became defective in the liquid crystal display device according to this embodiment, even when static electricity was generated. Accordingly, it is possible to provide a liquid crystal display device having a display section made up of a plurality of divided sections, wherein point defects do not occur at the dividing portion.

Figure 7:
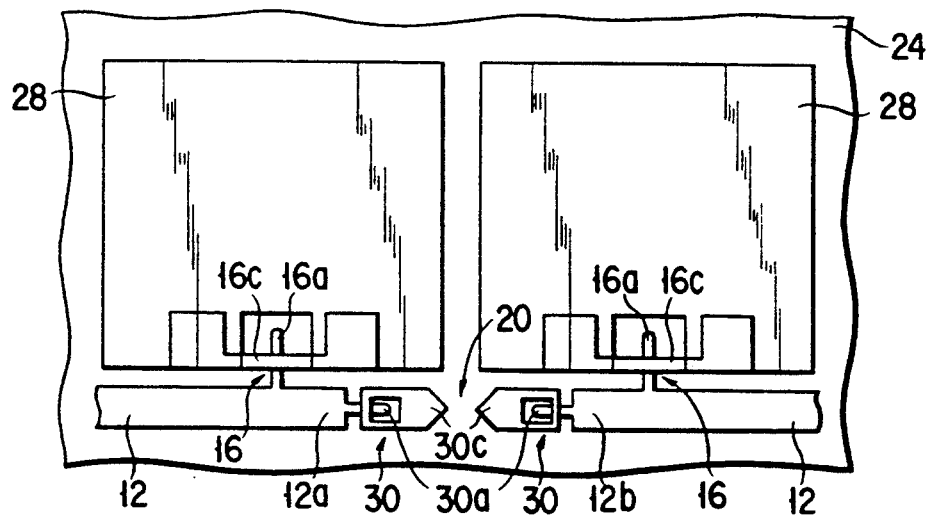
FIG. 7 is a plan view corresponding to FIG. 2, according to a modification of the first embodiment of the present invention.

FIG. 7 shows a modification of the above embodiment, wherein the upper metals 30c of the protecting MIM elements 30 opposing each other have the upper metals 30c have sharpened distal ends in order to facilitate the discharge between the elements. According to this modification, the driving MIM elements 16 are more reliably protected from puncture due to static electricity.

Figure 8:
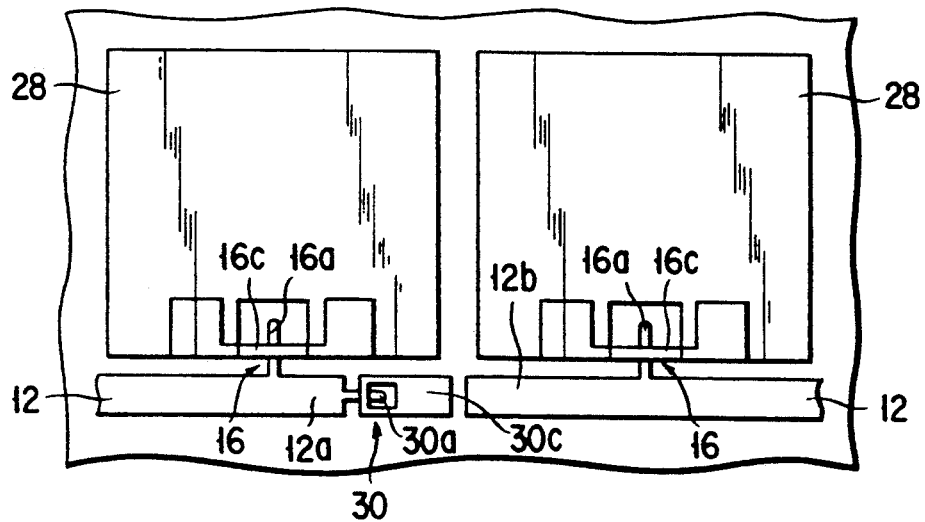
FIG. 8 is a plan view corresponding to FIG. 2, showing another modification of the first embodiment of the present invention.

FIG. 8 shows another modification of the above embodiment, wherein a protecting MIM element 30 is formed on only one of the paired divided ends 12a and 12b of a signal electrode 12. According to this modification also, the protecting MIM element 30 is punctured when static electricity flows therethrough, thereby obtaining the same effect as in the above embodiment.

In FIGS. 7 and 8, the same reference numerals as in the above embodiment show the same members or ports, thereby omitting the detailed description thereof.

Figure 9:
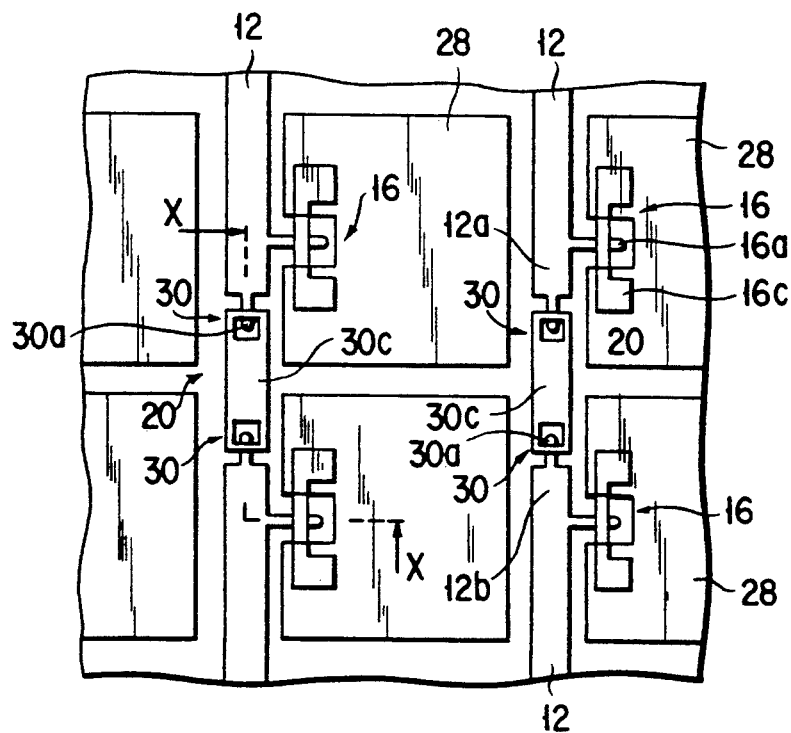
Figure 10:
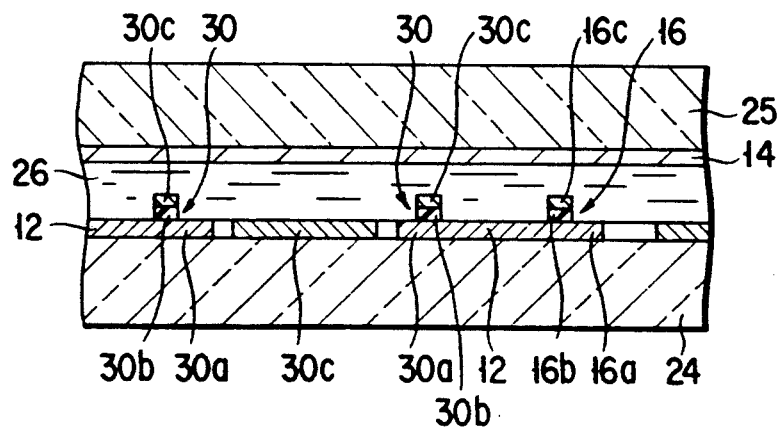

FIGS. 9 and 10 show a liquid crystal display device according to a second embodiment of the present invention. In FIGS. 9 and 10, the components which are common to those of the first embodiment are identified with the same reference numerals as in the first embodiment. The difference between the first and second embodiments will be described below in detail.

In the second embodiment, protecting MIM elements 30 are respectively formed o paired divided ends 12a and 12b of each signal electrode 12. The MIM elements 30 are connected in series by an upper metal 30c which is formed in common to these MIM elements. Therefore, the paired divided ends 12a and 12b are electrically connected to each other by the two MIM elements 30. The resistance of the MIM element 30 is set to be at least 20 times the output resistance of a driving integrated circuit (not shown) connected to the signal electrodes 12 and the scanning electrodes 14, so that a display operation is not adversely affected by the elements 30.

With the above structure, if a potential difference is generated between the divided ends 12a and 12b of each signal electrode 12 due to static electricity generated during manufacturing steps, the voltage half the above potential difference is applied to the two MIM elements 30 connected in series, by capacity dividing. The two MIM elements 30 become conductive and discharge the static electricity. Thus, the potential difference between the divided ends 12a and 12b is decreased, so that excessive static electricity does not flow through the driving MIM element 16, thereby preventing the MIM elements 16 from puncture due to static electricity.

As has been described above, the second embodiment also provides a liquid crystal display device wherein point defective due to static electricity can be prevented, thereby achieving satisfactory display.

The present invention is not limited to the above-described embodiments, and various changes and modifications can be made without departing from the spirit and scope of the invention.

For example, the material of the upper metal is not limited to chrome, but may be the other metal such as titanium, nickel, aluminum, or the like.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:
1. A liquid crystal display device comprising:
first and second substrates facing each other;
a liquid crystal layer sealed between the first and second substrates;
a number of pixel electrodes formed in a matrix pattern on an inner surface of the first substrate;
a plurality of driving nonlinear resistance elements formed on the inner surface of the first substrate and electrically connected to the pixel electrodes, for driving said pixel electrodes;
a plurality of parallel wiring electrodes formed on the inner surface of the first substrate, respectively extending in substantially parallel to the columns of said pixel electrodes, and electrically connected to the respective nonlinear resistance elements on the respective columns of said pixel electrodes, each of said wiring electrodes being divided at a dividing portion between two adjacent pixel electrodes and having a pair of divided ends which face each other with a distance therebetween; and
protecting nonlinear resistance elements, respectively provided at one of the divided ends of each of said wiring electrodes, for reducing potential difference between the divided ends of each wiring electrode when static electricity is generated at the dividing portions.

2. A device according to claim 1, wherein each of said driving nonlinear resistance elements includes an MIM element which comprises a lower metal electrically connected to the corresponding one of the wiring electrodes, an insulating layer formed on the lower metal, and an upper metal formed on the insulating layer and electrically connected to the pixel electrode.

3. A device according to claim 1, wherein each of said protecting nonlinear resistance elements includes an MIM element which comprises a lower metal electrically connected to the corresponding divided end, an insulating layer formed on the lower metal, and an upper metal formed on the insulating layer.

4. A device according to claim 1, which further comprises second protecting nonlinear resistance elements, respectively formed on the other one of the divided ends of each wiring electrode, for reducing potential difference between the divided ends of each wiring electrode.

5. A device according to claim 4, wherein each of said protecting nonlinear resistance elements provided at the divided ends of each wiring electrode includes an MIM element which comprises a lower metal electrically connected to the corresponding divided end, an insulating layer formed on the lower metal, and an upper metal formed on the insulating layer.

6. A device according to claim 5, wherein said upper metals of the protecting nonlinear resistance elements provided at the divided ends of each wiring electrode have distal ends spaced a predetermined distance apart from each other, said predetermined distance being shorter than the distance between the two adjacent pixel electrodes.

7. A device according to claim 6, wherein the distal ends of the upper metals are sharpened.

8. A device according to claim 1, wherein each of said wiring electrodes is divided at a substantially central portion in the longitudinal direction.

9. A liquid crystal device comprising:
first and second substrates facing each other;
a liquid crystal layer sealed between said substrates;
a number of pixel electrodes formed in a matrix pattern on an inner surface of the first substrate;
a plurality of driving nonlinear resistance elements formed on the inner surface of the first substrate and electrically connected to the pixel electrodes, respectively, for driving said pixel electrodes;
a plurality of parallel wiring electrodes formed on the inner surface of the first substrate, respectively extending in substantially parallel to the columns of said pixel electrodes, and electrically connected to the respective nonlinear resistance elements on the respective columns of said pixel electrodes, each of said wiring electrodes being divided at a dividing portion between two adjacent pixel electrodes and having a pair of divided ends which face each other with a distance therebetween; and a pair of protecting nonlinear resistance elements, respectively provided at the divided ends of each of said wiring electrodes, for reducing potential difference generated between the divided ends when static electricity is generated at the dividing portions of the wiring electrodes.

10. A device according to claim 9, wherein each of said driving nonlinear resistance elements includes an MIM element which comprises a lower metal electrically connected to the wiring electrode, an insulating layer formed on the lower metal, and an upper metal formed on the insulating layer and electrically connected to the pixel electrode.

11. A device according to claim 9, wherein each of said pair of protecting nonlinear resistance elements includes an MIM element which comprises a lower metal electrically connected to the corresponding divided end of the wiring electrode, an insulating layer formed on the lower metal, and an upper metal formed on the insulating layer, the upper metals of said pair of protecting nonlinear resistance elements being electrically connected to each other.

* * * * *